# United States Patent Office 3,252,979
Patented May 24, 1966

3,252,979
PEROXIDE-CONTAINING ADDUCTS OF AMINE COMPOUNDS AND THE PREPARATION THEREOF
Alexis A. Oswald, Clark, N.J., and Fernand Nöel, Sarnia, Ontario, Canada, assignors to Esso Research and Engineering Company, a corporation of Delaware
No Drawing. Filed Sept. 6, 1961, Ser. No. 136,208
12 Claims. (Cl. 260—268)

This invention relates to amine compounds and the preparation thereof. More particularly, it concerns the reaction of organic tertiary amines and their oxides with hydrogen peroxide to form adducts that are useful as oxidizing agents and catalysts.

It is known that aliphatic tertiary amines will react with dilute aqueous hydrogen peroxide solutions at ambient temperature to produce amine oxides. The aforementioned reaction is reported in the Journal of the Chemical Society, vol. 75, page 1004, by W. R. Dunstan et al. Subsequently H. Wieland in discussing various oxidation reactions mentions that hydrogen peroxide reacts with the two valences available on the nitrogen of tertiary amines and that the amine eventually is converted into the corresponding amine oxide. These oxides can be employed to prepare other useful organic compounds. For example, the N-oxide of nitrogen mustard is very effective in curing the Yoshida sarcoma.

It has now been discovered that hydrogen peroxide will form an addition compound with organic tertiary amines if the concentration of water in the reaction mixture is kept below that amount which will cause the initial reaction product to decompose. Since the principal source of water is the hydrogen peroxide solution, it is important to use peroxide solutions that contain not more than about 80 wt. percent water. Obviously where a nonaqueous hydrogen peroxide solution is employed it is not necessary to use a concentrated hydrogen peroxide solution since this is equivalent to utilizing pure hydrogen peroxide. It is also advisable, particularly where relatively dilute aqueous hydrogen peroxide solutions are used, to cool the reaction mixture to subambient temperatures.

The organic tertiary amine oxides also form adducts with hydrogen peroxide that can be recovered and used for many purposes, e.g. oxidants and polymerization catalysts. In this reaction the temperature can be higher than that recommended for the above-mentioned addition reaction. Here temperatures ranging from —10° up to 100° C. can be satisfactorily employed to make the adduct.

In carrying out one embodiment of the present invention, a saturated organic tertiary amine, i.e. an amine in which each of the three nitrogen valences is satisfied with a carbon atom, is reacted with about an equivalent amount of hydrogen peroxide at from about —50° C. to approximately room temperature, which when used as an aqueous solution should be relatively concentrated. The reaction is substantially instantaneous in most cases and seldom requires more than 10 or 15 minutes. Due to the exothermic nature of the reaction, it is recommended that the hydrogen peroxide or amine reactant be incrementally added to the other reactant so that the reaction temperature does not exceed about 30° C. It is advisable to use an external cooling means or large amounts of an inert diluent, such as methanol, to prevent the reaction mixture from rising much above room temperature.

The ratio of the reactants is not particularly important, although it will be found that the best results are obtained when a slight excess, e.g. about 10%, of hydrogen peroxide is employed. Broadly speaking, the ratio of hydrogen peroxide to reactive amine groups in the base should be about 0.5 to 2.0 mols per reactive site. For instance, in the case of triethyl amine a molar ratio of about 1:1 is eminently suitable. If the base reactant is a diamine or triamine, proportionately larger molar ratios should be employed, i.e. 2:1 and 3:1.

As mentioned above, the temperature of the reaction mixture is preferably kept below room temperature, e.g. 20° C. or less. Most of the reactions can be satisfactorily effected at temperatures in the range of about —10 to 10° C. Pressure is not a critical condition and, therefore, for economic reasons it is usually best to carry out the reaction at approximately atmospheric pressure. However, in the case where the amine reactant is normally a gas, e.g. triethylamine, it may be desirable to resort to superatmospheric pressure, e.g. to 50 p.s.i.g., rather than lower the temperature to below the boiling point of the reactant.

If the amine reactant is a liquid, essentially pure hydrogen peroxide can be used. However, in many instances it is advantageous to use a diluent, such as water, alcohol, ketone or ether. The concentration of the diluent in the reaction mixture can range from 0 to about 90 wt. percent and preferably is about 20 to 80 wt. percent. The diluent should be a lower molecular weight saturated organic compound, except of course in the case of water, which does not adversely affect the desired reaction. The organic liquid diluents usually have 1 to 7 carbon atoms and can have either an aliphatic or cyclic structure. If a ketone is selected as the diluent, it is advisable to maintain the reaction temperature below 0° C. in order to prevent the ketone from reacting with the hydrogen peroxide.

Among the monohydric alcohols, ketones, ethers and sulfones that can be used in the present invention are methanol, ethanol, isopropanol, methylethylketone, cyclohexanone, tetrahydrofuran, diethyl ether, diisopropanol ether, tetramethylene sulfone and dimethyl sulfone.

As indicated above, the hydrogen peroxide reactant should not contain more than about 80 wt. percent water. More dilute hydrogen peroxide solutions, e.g. as low as 3 wt. percent, can be utilized if the diluent is nonaqueous. Thus, the concentration of hydrogen peroxide added to the reaction mixture can vary from a few weight percent up to 100 wt. percent, except in the case of aqueous solutions in which case it is preferred to use at least a 30 wt. percent solution due to the adverse effect of water on the reaction product. In other words, hydrogen peroxide liquids containing from 0 to 70 wt. percent water can be successfully used over a wide range of temperatures.

The amine reactant can be either cyclic or aliphatic and usually its organic moiety is hydrocarbon. There can be more than one tertiary amine group in the reaction. For example, it is intended to include within the scope of the invention any saturated organic compound containing a tertiary amine. Diamines, triamines and even tetramines can be used to prepare the various adducts. The preferred saturated hydrocarbyl tertiary amines can be represented by the following formula:

$$(N)_y Z_3 N$$

wherein N is nitrogen, Z is selected from the group consisting of alkyl and alkylene radicals having 1 to 30 carbon atoms and preferably 1 to 6 carbon atoms; y is 0 when Z is alkyl and y is 1 when Z is alkylene.

Among the amine reactants that can be used in the present invention are trimethylamine, triethylamine, trihexylamine, diethylmethylamine, triethylenediamine, hexamethylene tetramine, trimethylenediamine, dimethyl-n-hexadecylamine, tri - 2 - chloroethylamine, dihydroxymethyl - n - octadecylamine, dichloromethyl - n - dodecylamine, triethanolamine, dimethylcyclohexylamine, di-2-chloroethylmethylamine, atrophine, scopolamine, tropidine, nicotine, N,N,N',N'-tetramethylethylenediamine, N- methylpiperidine, N,N'-dimethylpiperazine. The preferred amine reactants are the lower molecular weight substances, that is those compounds having 3 to 8 carbon atoms per molecule.

The adducts formed by the above-described reaction have at least one of the following characteristic groups:

$$\equiv N \cdot H_2O_2$$

wherein N is nitrogen, H is hydrogen, O is oxygen and the valences on the nitrogen atom are satisfied with carbon atoms that are a part of organic radicals. For instance, in the case where the amine reactant is a trialkyl tertiary amine the adduct has the following structural formula:

$$R_3N \cdot H_2O_2$$

wherein R is an alkyl group. Similarly, when the amine reactant is a trialkylenediamine the adduct has this formula:

$$H_2O_2 \cdot NR_3 \cdot N \cdot H_2O_2$$

wherein R' is an alkylene group. The adducts are generally liquids or solids and are stable at room and lower temperatures. In addition to the trialkylanmine hydrogen peroxide and trialkylenediamine dihydrogen peroxides shown above, other tertiary amine adducts, such as hexa-alkylene tetramine tetrahydrogen peroxide adducts may be formed from the corresponding amine reactant.

The peroxide adducts are readily decomposed to form the corresponding amine oxides by simply heating them to an elevated temperature for from a few minutes to 6 hours. In most instances the conversion is substantially quantitative. One advantage of the higher molecular weight amine reactants, such as triethylene diamine, is that they form solid adducts that can be filtered from the reaction mixture and thus freed of any by-products and unreactive materials. In this way a high purity oxide is formed.

The decomposition temperature selected will depend to a large extent on the stability of the peroxide adduct. For example, the trialkylamine hydrogen peroxide adducts generally begin decomposing at temperatures as low as 40° C. On the other hand, other peroxide adducts, such as triethylenediamine dihydrogen peroxide, require the utilization of substantially higher temperatures, such as 90° or 100° C. In general, it will be found that the amine oxide will be rapidly formed by heating the peroxide adduct at about 50° to 110° C. for about 10 to 60 minutes.

The amine oxides, which have the characteristic group $\equiv NO$, can be reacted with hydrogen peroxide in a manner similar to that described in connection with the tertiary amine to form an amine oxide-peroxide adduct which is useful as an oxidant in many types of reactions. In this reaction, the temperature is not as important as it is in the previously described addition reaction. In fact, temperatures as high as 70° C. can be employed. The addition reaction is advantageously carried out at temperatures of −10° to 40° C. under subsantially atmospheric pressure for about 10 to 120 minutes or more. Again, a substantially equivalent amount of peroxide is employed. Likewise, the diluents utilized in the first addition reaction can be used here.

The tertiary amine oxide-hydrogen peroxide adducts contain the following characteristic group:

$$\equiv NO \cdot H_2O_2$$

wherein the unsatisfied nitrogen valences are connected to carbon atoms. The trialkyl tertiary amine oxide-hydrogen peroxide adducts can be represented by the following formula:

$$R_3NO \cdot H_2O_2$$

wherein R is an alkyl group. The tertiary diamine oxide-dihydrogen peroxide adducts have the following formula:

$$H_2O_2 \cdot ONR_3'NO \cdot H_2O_2$$

wherein R' is an alkylene group.

The preferred amine oxide-hydrogen peroxide adducts and amine-hydrogen peroxide adducts have the following formula:

$$(XN)_yZ_3NX$$

wherein N is nitrogen, Z is selected from the group consisting of alkyl and alkylene radicals having 1 to 30 carbon atoms, preferably 1 to 6 carbon atoms, X is selected from the group consisting of $H_2O_2$ and $O \cdot H_2O_2$, y is 1 when Z is an alkylene radical and y is 0 when Z is an alkyl radical.

The following adducts are representative of the type of products formed by the above-described addition reactions: dimethyl-n-hexadecylamine hydrogen peroxide, N-butylpiperidine hydrogen peroxide, N-methyl-morpholine hydrogen peroxide, scopolamine hydrogen peroxide, N,N,N',N'-tetramethylethylene diamine dihydrogen peroxide, N,N'-diethylpiperazine dihydrogen peroxide, triethylene diamine dihydrogen peroxide, and hexamethylene tetramine trihydrogen peroxide.

The adduct (triethylenediammonium diperoxide) formed by the reaction of one mol of triethylene diamine with two mols of hydrogen peroxide is interesting because it is a colorless crystalline solid that can easily be separated from the reaction mixture. Triethylenediammonium diperoxide is quite soluble in water and methanol and substantially insoluble in hydrocarbons, such as benzene and ether. The peroxide character of the adduct is shown by its reaction with sodium iodide. The dihydrogen peroxide product reacts quantitatively with aromatic mercaptans, such as 2-naphthalenethiol, to form triethylenediamine, water and diaryl disulfide.

Triethylenediammonium diperoxide can be synthesized in water, ether, alcohol and benzene. Even in cases, where less than equivalent amount of hydrogen peroxide is added, the diperoxide precipitates. To avoid the decomposition of the diperoxide, it is advisable to quickly remove all the water and alcohol from the precipitate by solvent washing or vacuum drying.

On the basis of infrared studies, it is apparent that the hydrogen peroxide-triethylenediamine adduct is a hydrogen bonded polar complex and not an ionic ammonium salt.

The trialkylamine-hydrogen peroxide adducts formed by reacting aliphatic tertiary amines with hydrogen peroxide are usually colorless liquids that are more unstable than the diperoxide adducts. They also oxidize 2-naphthalenethiol to the disulfide and have an infrared spectra characteristic of the hydrogen bonding found in the triethylenediammonium diperoxide complex. Consequently the trialkylamine-hydrogen peroxide adducts are considered to be polar complexes with hydrogen bonds rather than ionic salts.

Triethylenediammonium diperoxide starts to decompose at about 60° C. The reaction is best carried out at about 100° C. by adding the diperoxide to the decomposition mixture with stirring at a rate such that the temperature does not rise above 105° C. The decomposition product solidifies on standing at room temperature to a crystalline mass melting at 52° to 54° C. The latter product, which is the dihydrate of triethylenediamine dioxide, does not oxidize mercaptans. The decomposition reaction is shown by the following equation:

$$H_2O_2 \cdot N(CH_2CH_2)_3N \cdot H_2O_2 \rightarrow$$
$$H_2O \cdot ON(CH_2CH_2)_3NO \cdot H_2O$$

The dihydrate loses 1 mol of water when dried in vacuo at 60° C. to form a hygroscopic monohydrate.

The trialkylammonium peroxide decomposes in a similar manner at about 50° C. Cooling is usually necessary in order to keep the decomposition under control.

The triethylenediamine dioxide readily reacts with about 2 mols of hydrogen peroxide to form the corresponding diamine dioxide-dihydrogen peroxide adduct in methanol at 60° C. A solid product is formed on cooling the reaction mixture. This addition reaction is represented by the following equation:

$$ON(CH_2CH_2)_3NO + 2H_2O_2 \rightarrow H_2O_2 \cdot ON(CH_2CH_2)_3NO \cdot H_2O_2$$

The trialkyl tertiary amine oxides also form an addition product when reacted with an equimolar amount of hydrogen peroxide. Anhydrous peroxide or aqueous solutions containing at least 30% hydrogen peroxide are preferably used in the reaction. More dilute peroxide solutions can be employed, if desired. The hydrogen peroxide adducts of trimethylamine oxide and triethylamine oxide can be recovered in the form of well defined crystalline compounds. The adducts of tri-n-propylamine and tri-n-butylamine are viscous liquids at room temperature and could not be crystallized.

The solubility characteristics of trialkylamine oxide-hydrogen peroxide adducts are similar to those of trialkylamine oxides. They are highly soluble in water and alcohol, and only slightly soluble in ether, acetone and benzene. The latter solvents can be used for the precipitation of the crystalline hydrogen peroxide adduct from very concentrated water solutions. The crystalline hydrogen peroxide adducts do not show the strong hygroscopicity characteristic of the lower molecular weight anhydrous trialkylamine oxides. They decompose with gas evolution on heating.

The invention is further illustrated by the following examples. All percents in the examples are by weight unless otherwise indicated.

EXAMPLE 1

*Triethylenediammonium diperoxide synthesis in ether*

To a solution of 11.2 g. (0.1 mol) of triethylenediamine (1,4-diazabicyclo[2.2.2]octane) in 200 ml. of diethyl ether, 7.9 g. of 90% aqueous hydrogen peroxide (0.2 mol) was added portionwise with stirring over about a half-hour period. The temperature of the reaction mixture was kept below 20° with occasional ice-water cooling during the addition. A slightly exothermic reaction resulting in the instantaneous precipitation of the colorless diperoxide took place. The precipitate was filtered with suction, washed with ether, and dried in vacuo at room temperature to yield 15.5 g. (86%) of triethylenediammonium diperoxide.

EXAMPLE 2

*Triethylenediammonium diperoxide synthesis in methanol*

To a solution of 11.2 g. (0.1 mol) of triethylenediamine in 20 ml. of methanol, 4 g. of 90% hydrogen peroxide (0.1 mol) was added slowly over about a half-hour period with stirring and cooling. The resulting crystal slurry was diluted with 80 ml. of benzene and filtered with suction. The temperature of the mixture was kept below 5° during all these operations. The resulting crystal cake was washed with benzene and dried in vacuo to yield 85.5 g. (91.6) of diethylenediammonium dioxide. An infrared spectrum of this compound in a 0.1% KBr pellet is identical with that of the compound precipitated from ether.

EXAMPLE 3

*Triethylenediamine dioxide*

About 3 g. of the 60 g. (0.33 mol) of diperoxide starting material was placed into a large test tube and was stirred with a thermometer while it was slowly heated up using a water bath. At about 60° the temperature of the dry finely divided powder started to rise. Solid carbon dioxide-alcohol cooling was used to keep the temperature at about 100° C.

The rest of the diperoxide was decomposed at about 100° by adding it to the stirred decomposition mixture in portions. After all the diperoxide has been added and the exothermic decomposition has subsided, the mixture is heated at 100° for 1 hour to complete the decomposition. An almost colorless liquid resulted which solidified to a colorless crystalline mass on standing at room temperature. This was dried to yield 5.7 g., 95% of triethylenediamine dioxide dihydrate (M.P. 52–54°).

When the dihydrate was melted and dried for 6 hours at 60°, it lost one mol of water and formed the amorphous, colorless, hygroscopic monohydrate.

EXAMPLE 4

*Trialkylammonium peroxides*

To 0.1 mol of tri-alkyl- (methyl-, ethyl-, propyl-, butyl-) amine, 0.1 mol of 90% hydrogen peroxide was added at −50°. An instantaneous slightly exothermic reaction took place and a colorless mixture was obtained. This mixture is a very viscous liquid at −50° while the amine component is a mobile liquid. At 0° the mixture is a clear liquid. At room temperature, it is unstable and exothermically decomposes.

*Determination of hydrogen peroxide adducts by the mercaptan method*

The hydrogen peroxide content of each adduct was determined by dissolving about 0.001 M of the adduct in about 5 ml. of methanol and 10 ml. of 0.2 M naphthalenethiol solution in toluene, and then adding 0.3 ml. of 1,1,3,3-tetramethylbutylamine. The mixture was allowed to stand for 30 minutes. If precipitation (bis-2-naphthyl disulfide) was observed during this period, additional toluene was added to the mixture until it became a clear solution. After a half hour the solution was diluted with 100 ml. of alcoholic sodium acetate and titrated potentiometrically for thiol content with 0.1 N silver nitrate solution in isopropyl alcohol in the usual manner.

EXAMPLE 5

*Trialkylamine oxides*

When the liquid unstable trialkylammonium peroxides were allowed to come to room temperature an exothermic decomposition took place. The temperature rose spontaneously to 50°. At this temperature effective cooling (e.g. with solid $CO_2$-alcohol mixture) was necessary to keep the decomposition under control. After the exothermic reaction subsided the resulting mixtures were stirred for an additional hour at 60–100° to complete the reaction. The temperature used was directly proportional with the molecular weight of the amine from trimethyl to tributylamine.

EXAMPLE 6

*Triethylenediamine dioxide dihydrogen peroxide adduct from triethylenediamine dioxide*

4.4 g. (0.12 mol) of 90% hydrogen peroxide was added dropwise to 9 g. (0.05 mol) of liquid triethylenediamine dioxide dihydrate at 70° with stirring and cooling in the course of an hour. The reaction mixture was allowed to cool to room temperature and crystallize at 0°. By filtration and subsequent drying in vacuo, 7.5 g. (70.5%) of triethylenediamine dioxide dihydrogen peroxide was obtained in the form of colorless crystals.

Triethylenediamine dioxide dihydrogen peroxide can be also prepared in the heterogeneous phase by stirring solid triethylenediamine dioxide hydrate in 90% hydrogen peroxide at room temperature.

EXAMPLE 7

*Triethylenediamine dioxide dihydrogen peroxide adduct from triethylenediamine*

To a solution of 5.6 g. (0.05 mol) triethylenediamine in 15 ml. methanol, 8.3 g. (0.22 mol) of 90% hydrogen peroxide was added slowly at about 60° in the course of an hour. Then the mixture was slowly cooled to −40° and filtered to yield 6.8 g. (64%) triethylenediamine dioxide dihydrogen peroxide.

EXAMPLE 8

*Trialkylamine oxide-hydrogen peroxide adducts from trialkylamine oxides*

A 90% aqueous solution of 0.11 mol hydrogen peroxide was added to 0.1 mol of trialkylamine oxide or its hydrate at room temperature and the mixture was stirred until a homogeneous liquid resulted. The hydrogen peroxide adducts of trimethylamine oxide and triethylamine oxide were then crystallized from the corresponding solutions by concentrating them in vacuo or by dilution with acetone and subsequent cooling by solid $CO_2$-alcohol mixture. The yields were to 64% and 73%, respectively. The raw hydrogen peroxide adducts of tri-n-propylamine oxide and tri-n-butylamine oxide could not be crystallized. The peroxide character of the adducts was checked by reacting them with 2-naphthalenethiol. One mol of the adduct oxidized two mols (±4%) of thiol.

EXAMPLE 9

*Trialkylamine oxide hydrogen peroxide adducts from trialkylamines*

A 90% aqueous solution of 0.21 mol of hydrogen peroxide was added to 0.1 mol of trialkylamine at −50° with stirring. The resulting mixture was allowed to come to room temperature, where a spontaneous, exothermic reaction started. The temperature was kept below 50° with cooling until the reaction subsided. In the case of triethyl-tri-n-propyl- and tri-n-butyl-amine oxides, heterogeneous liquid mixtures with some free amine on the top resulted temporarily. These were stirred for an additional hour at 50° to form a homogeneous mixture. On concentration or on dilution with acetone and cooling, the hydrogen peroxide adducts of trimethylamine oxide and triethylamine oxide crystallized from the corresponding reaction mixtures in 52% and 69% yield, respectively.

EXAMPLE 10

*Trimethylamine oxide-hydrogen peroxide adduct from trimethylammonium peroxide*

Trimethylammonium peroxide (0.1 mol) started to decompose exothermically at room temperature. The temperature of the liquid peroxide rose to 38° where a strong evolution of trimethylamine gas started. By the end of the exothermic decomposition, the mixture lost 2.7 g. weight. The liquid residue partly solidified on standing and yielded 3.2 g. (59%) of trimethylamine oxide-hydrogen peroxide, which decomposed on fast heating at 87° with strong gas evolution and the formation of a liquid.

Triethylamine oxide-hydrogen peroxide adduct also crystallized in 40% yield from an equimolar mixture of triethylamine and 90% hydrogen peroxide after 2 days' standing on a watchglass.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. Hydrogen peroxide adducts of tertiary, saturated $C_3$ to $C_{20}$ aliphatic amines and tertiary, saturated $C_3$ to $C_{20}$ aliphatic amine oxides.
2. Hydrogen peroxide adducts of tertiary $C_3$ to $C_{20}$ trialkylamines and tertiary $C_3$ to $C_{20}$ trialkylamine oxides.
3. Hydrogen peroxide adducts of tertiary $C_3$ to $C_8$ trialkylamines and tertiary $C_3$ to $C_8$ trialkylamine oxides.
4. Hydrogen peroxide adducts of tertiary $C_6$ hydrocarbyl polyalkylene polyamines and tertiary $C_6$ hydrocarbyl polyalkylene polyamine oxides.
5. Hydrogen peroxide adducts of tertiary triethylenediamine di-N-oxides.
6. Triethylenediammonium diperoxide.
7. A process for preparing hydrogen peroxide containing adducts of tertiary, saturated $C_3$ to $C_{20}$ aliphatic amines which comprises mixing hydrogen peroxide liquid containing not more than about 80 wt. percent water with a tertiary, saturated $C_3$ to $C_{20}$ aliphatic amine at temperatures ranging from about −50 to about 30° C.
8. A process as in claim 7 which includes the step of heating said adduct at temperatures of about 40 to 110° C. to decompose it to the corresponding amine oxide, and mixing said amine oxide with hydrogen peroxide at temperatures up to about 70° C. to form the corresponding hydrogen peroxide adduct of said amine oxide.
9. A process as in claim 7 wherein said amine is a $C_3$ to $C_{20}$ tertiary trialkyl amine, said hydrogen peroxide liquid contains from 0 to 70 wt. percent water, said mixing temperatures ranges from about −50 to 10° C. and the mole ratio of hydrogen peroxide to amine groups ranges from about 0.5 to 2:1.
10. A process as in claim 9 wherein said $C_3$ to $C_{20}$ tertiary trialkyl amine contains from 3 to 8 carbon atoms.
11. A process for preparing hydrogen peroxide containing adducts of tertiary $C_6$ hydrocarbyl polyalkylene polyamines which comprises mixing hydrogen peroxide liquid containing from about 0 to 70 wt. percent water with a tertiary $C_6$ hydrocarbyl polyalkylene polyamine at temperatures ranging from about −50 to 30° C. wherein the mole ratio of hydrogen peroxide to reactive amine groups ranges from about 0.5 to 2:1.
12. A process as in claim 11 which includes the step of heating said adduct at temperatures of about 40 to 110° C. to decompose it to the corresponding amine oxide and mixing said amine oxide with hydrogen peroxide at temperatures up to about 70° C. to form the corresponding hydrogen peroxide adduct of said amine oxide.

References Cited by the Examiner

UNITED STATES PATENTS 3,038,903   6/1962   Farkas et al. _____ 260—268

OTHER REFERENCES

Dunstan et al.: Chemical Society Journal, vol. 75, pp. 1004–11 (1899).

Ya A. Fialkov et al.: Chem. Abstract, vol. 48 (1954), p. 5091e.

NICHOLAS S. RIZZO, *Primary Examiner.*

LEON ZITVER, WALTER A. MODANCE, MUZIO B. ROBERTO, NORMAN H. STEPNO, JAMES W. ADAMS, *Assistant Examiners.*